April 23, 1968 A. JOVIS 3,379,854
AUTO LOCK DE-ICING
Filed Aug. 25, 1967
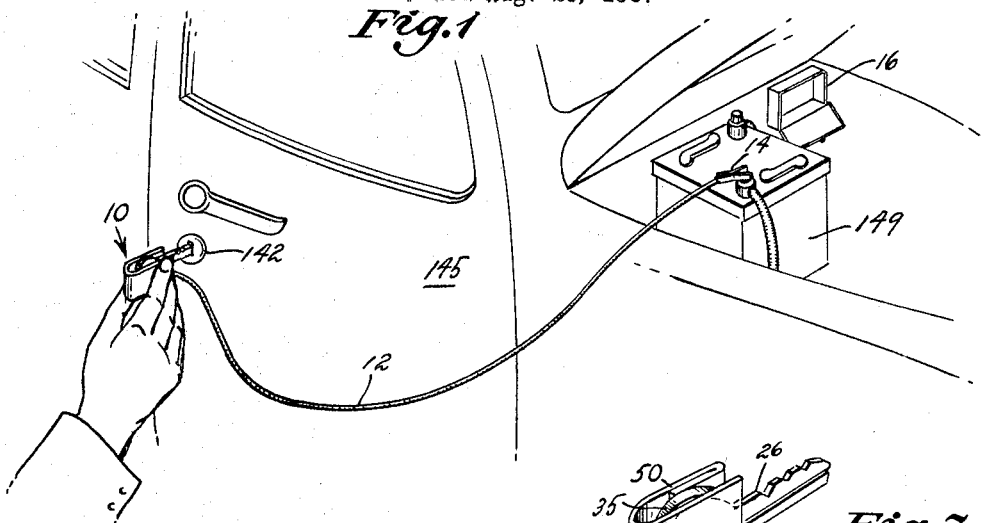
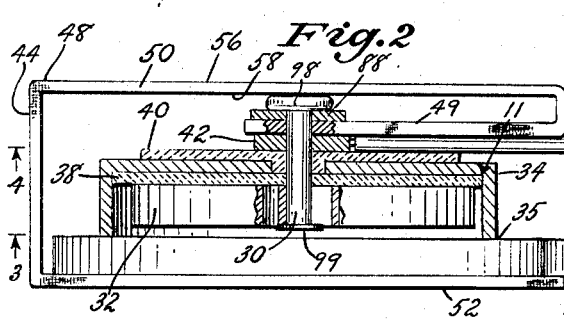
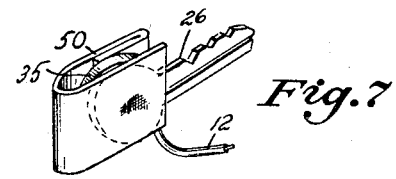
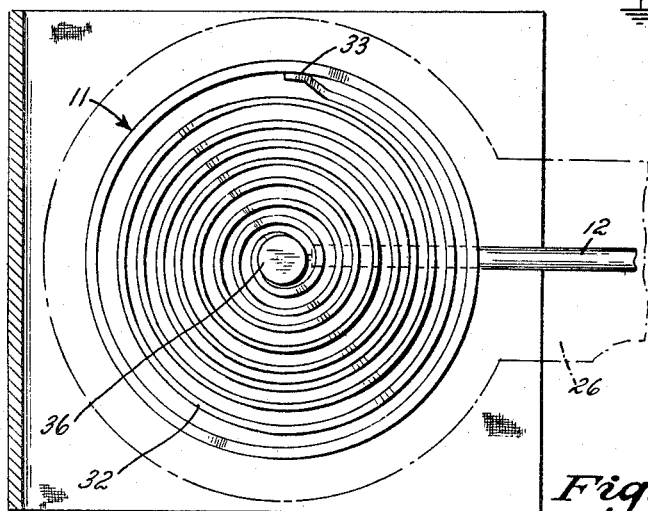
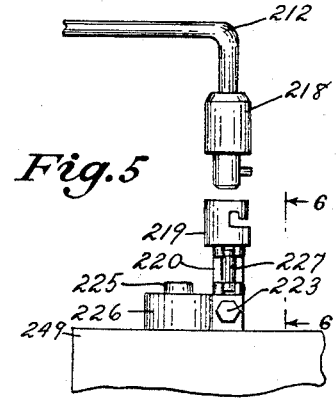
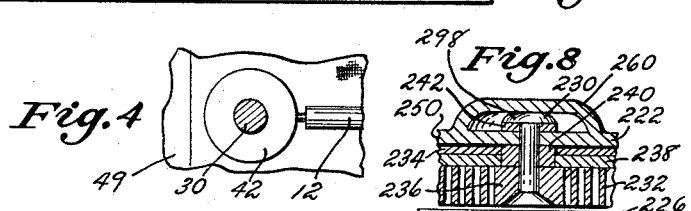
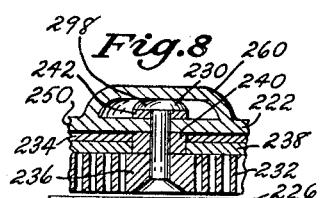
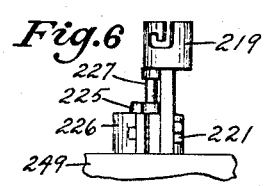

United States Patent Office

3,379,854
Patented Apr. 23, 1968

3,379,854
AUTO LOCK DE-ICING
Arthur Jovis, New York, N.Y.
(1501 Undercliff Ave., Bronx, N.Y. 10453)
Substituted for abandoned application Ser. No. 449,743, Apr. 21, 1965. This application Aug. 25, 1967, Ser. No. 671,905
3 Claims. (Cl. 219—201)

ABSTRACT OF THE DISCLOSURE

An electric heating device for de-icing automobile locks by heating the key therefor, using an automible storage battery as a current source. The device consists of a resilient, non-conductive holder, a conductive housing in the holder and an electric resistance element supported by the housing. The key is disposed in the holder in heat exchange relationship to the heating element.

---

The application is a substitute application related to my previous application Ser. No. 449,743 filed Apr. 21, 1965, entitled, Auto Lock De-Icing, now abandoned.

This invention relates generally to the field of heating devices, and more particularly to an improved heating element for de-icing the interior of an automobile lock by using the key corresponding to the lock, thus providing the most effective means of heating the interior of the lock.

It is among the principal objects of the present invention to provide an improved auto lock de-icer which may be operated off the power supply of an automobile battery only.

Another object of the invention lies in the provision of a unit in the form of a holder which may accommodate any size automobile key.

A further object of the present invention lies in the provision of a simple yet dependable heating element within the heating unit.

Another object of the present invention lies in the provision of a heating unit which will transfer its heat directly to the key, which will therefore transfer its heat to the lock and defreeze the lock.

A still further object of the invention lies in the provision of a storage compartment located under the hood of the automobile, so as to provide ready access to the device when the emergency for its need arises. This is important because the device must be accessible at all times, since if the device were to be stored in the body of the car itself, the frozen lock would prevent access to the device, and hence it would defeat its own purpose.

A feature of the invention lies in the unusually simple and adaptable construction which allows the insertion of any thickness of key within the heating unit.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a view in perspective illustrating the first embodiment of the invention in use.

FIGURE 2 is an enlarged fragmentary elevational view, partly in section, illustrating the structure of the heating unit and the connection to the storage battery.

FIGURE 3 is a fragmentary sectional view as seen from the plane 3—3 in FIGURE 2.

FIGURE 4 is a fragmentary cross sectional view as seen from the plane 4—4 in FIGURE 2.

FIGURE 5 is an elevational view of a modification of the detachable circuit-connecting means in connection with the storage battery.

FIGURE 6 is an elevational view as seen from the plane 6—6 in FIGURE 5.

FIGURE 7 is a slightly enlarged perspective view of the heating unit and its application to the key, as shown in FIGURE 1.

FIGURE 8 is a fragmentary sectional view corresponding to the central portion of FIGURE 2, but showing a modification.

In accordance with the invention, there is illustrated in FIGURE 1 an improved auto lock de-icer, generally indicated by reference character 10, and comprising broadly: a heater unit 11, a cable 12, and a clamp connector 14. A suitably sized container 16 is secured under the car hood, for example on the back wall of the engine compartment, in which the de-icer is stored while not in use.

More particularly, as shown, in FIGURE 2, the clamp connector 14 may comprise a pair of alligator jaws 18 which are permanently electrically connected to the cable 12. The cable 12 is suitably insulated. The insulation is of a material which will retain its flexibility at subzero temperatures, and will not deteriorate at the relatively high temperatures that develop under the engine hood.

The heating element 11 is joined to a holder element 22, which has the characteristics of non-conductivity to electricity and heat, and elasticity to allow insertion of the varying thicknesses of keys. Examples of suitable materials are woven glass fiber textile, heat-resistant rubber or silicone, or a metal strip lined with an insulating and heat-resistant material. Where a heat-resistant synthetic resin, is used, it shall have a softening point at least 100 degrees F. above the temperature of the heating unit during operation.

As best seen in FIGURE 2, the holder element 22 comprises a first wall portion 49, a second wall portion 50, a third end wall portion 44, and a fourth wall portion 52.

The first wall portion 49 has a hole through which a rivet 30 passes. Rivet 30 has heads 98 and 99. The rivet 30 holds the following parts together: a heater coil 32 having an innermost convolution 36; an insulating support member 38; a cup-shaped heater coil housing 34; an insulating stepped washer 40; an electrical connection 42; and a pressure distributing washer 88.

The heater unit 11 includes the electrical resistance coil 32 bonded at one therminal 33 to the housing 34 (FIGURE 3) and at the other terminal; the innermost convolution forms a hollow core through which the rivet 36 passes, the heat 99 thereof making the other electrical contact thereto. The unit 11 is arranged and constructed to maintain a temperature of approximately 400 degrees F. when connected to a predetermined electrical potential which is usually, though not necessarily, either six or twelve volts, depending upon the source of power used to heat the coil. The diameter of the heater unit and its corresponding housing will be such that the housing will be slightly less in diameter than the head of the usual automobile door key.

The heater coil housing 34 provides a chamber and is a formed metal cup (or cylinder). The internal diameter of this housing is preferably about $\tfrac{3}{32}''$ greater than the external diameter of the heater coil. The edge of the rim of the housing, while shown straight, may be flared outwardly to give better bearing surface against the heat of the key when the key is inserted in the holder. A hole in the center of the base of the housing will provide a close fit for insulating washer 40.

The disc insulator 38 is preferably composed of mica, and placed in the base of the housing to prevent passage of the applied electrical current from the coils of the heating unit directly to the coil housing.

The insulating stepped washer 40 not only serves to confine the current in the rivet 30 but also increases the heat insulation.

The connector 42, which is bonded to an end of the cable 12, conducts current to the rivet 30.

In operation, the de-icer is connected by the alligator jaws 18 to the ungrounded terminal of the storage battery 149, and the head of the key is placed in the holding element 22 between the edge 35 of the heating unit housing 34 and the portion 52 of the holder element 22. The portions 52 and 56 of the holder element 22 are then squeezed together between thumb and forefinger so that the head of the key 26 bears firmly against the rim 35 of the heating unit housing. The key is then inserted, as far as icing conditions permit, into the keyhole of the doorlock 142 in door 145. This action completes the electrical circuit through the heating unit. As the heating unit reaches optimum temperature, its heat will be transferred to the key and the key in turn will heat the frozen lock until the lock is de-iced and the key can be turned in the lock.

Turning to FIGURES 5 and 6, there is shown a modification of the detachable circuit connecting means for connecting the storage battery 149. Here the cable 212 has a male bayonet terminal 218 which is detachably engageable with a female bayonet receptacle 219. Receptacle 219 is affixed to the upper end of a fuse block 220, the lower end of which has a hole through which the bolt 221 passes, and it has a nut 223. Block 220 has a replaceable fuse secured against the clamp 226 which engages post 225 of battery 249.

This construction affords a quicker and more convenient mode of attachment for the end of the cable 12 so that older persons and women may more easily use the present device. Furthermore, the receptacle 219 serves as a handy means for the connection of other devices (with a grounding on the car body or chassis), such as an engine light, a wheel-changing light, or a safety signal.

The introduction of a fuse in the circuit precludes a short circuit or overload of the battery, and the use of the receptacle, once it has been properly and correctly installed on the battery terminal, establishes the ungrounded battery terminal, which an inexperienced person would not recognize.

Turning to the modification shown in FIGURE 8, the core 236 of the heater coil 232 is pierced by a hole to receive the rivet 230. The hole in this core is countersunk at one end so that where one end of the rivet is peened or swaged into this countersink, the end of the rivet will be flush with the face of the core 236 of the heater coil 232. The insulator washer 238 has a hole in the center thereof to contain the insulating washer 240.

The heat resistant insulating washer 240 surrounds the rivet 230 between the heating unit core 236 and the outer holder element 222, its purpose being to electrically separate the rivet 230 and the core 236 from the housing 234.

The electrical connector 242 is disposed under the head 298 of the rivet 230 between the rivet head and the portion 250 of the holder element 222. The cable (not shown) is electrically bonded to connector 242, and serves to connect the power source to operate the auto lock de-icer.

A heat insulating cover 260 is bonded or cemented to the holder 222 over the rivet 230 and over the connector 242. This is provided to protect the user of the de-icer from the heat which will be transferred from the heating unit to the surrounding metal objects (in this case, the head of the rivet and the electrical connector).

I wish it to be understood that I do not consider the invention limited to the precise details of structure shown and set forth in this specification, for obvious modifications will occur to those skilled in the art to which the invention pertains.

I claim:

1. An improved automobile lock heating device utilizing the corresponding key for said lock, comprising: a heating unit including a non-conductive resilient holder having an inner chamber and an inner wall, said wall having a through bore, electrically conductive securement means passing through said bore of said inner wall and being separated therefrom by insulating means, electrical conduit means having a flattened end portion wtih a second through bore abutting said inner wall, said electrically conductive securement means passing through said second bore, second insulating means abutting said flattened end portion and having a third bore, said electrically conductive securement means passing through said third bore; electrically conductive housing means abutting said second insulating means and having a fourth bore, said electrically conductive securement means passing through said fourth bore, third insulating means abutting said electrically conductive housing inwardly of the second insulating means and having fifth bore, said electrically conductive securement means passing through said fifth bore, electrical heating means abutting said third insulating means and positioned within said electrically conductive housing, said electrical heating means being secured to the electrically conductive securement means, the housing and electircal heating means being spaced from the holder to allow a key to be inserted between the holder and the housing and heating means.

2. The invention according to claim 1, in which electrical heating means comprises a heater coil connected to said electrical securement means and to said electrically conductive housing, said electrically conductive securement means being a rivet.

3. The invention according to claim 1 in which the holder comprises a first side wall having an inner surface, a first end wall disposed outwardly and substantially perpendicular to said side wall, a second side wall disposed outwardly and substantially perpendicular to said end wall and parallel to said first side wall, a second end wall disposed outwardy of said second side wall and extending toward said first side wall, and an inner wall disposed inwardly of said second end wall an parallel to said first and second side walls.

References Cited

UNITED STATES PATENTS

| | | | |
|---|---|---|---|
| 2,371,534 | 3/1945 | McGrath | 219—220 |
| 2,530,513 | 11/1950 | Drugan | 219—201 |
| 2,774,855 | 12/1956 | Simmons | 219—201 X |
| 2,965,741 | 12/1960 | Blazina | 219—200 |
| 3,022,408 | 2/1962 | Wagner | 219—201 X |

RICHARD M. WOOD, *Primary Examiner.*

C. L. ALBRITTON, *Assistant Examiner.*